Oct. 29, 1957     D. V. TUTTLE     2,811,626
COMBINATION PRECOOK TIMER AND CONTROLLER TIMER
Filed May 18, 1954     6 Sheets-Sheet 1

*Fig. 9.*

*Fig. 1.*

INVENTOR.
DANIEL V. TUTTLE
BY
L. A. Paley
Att'y.

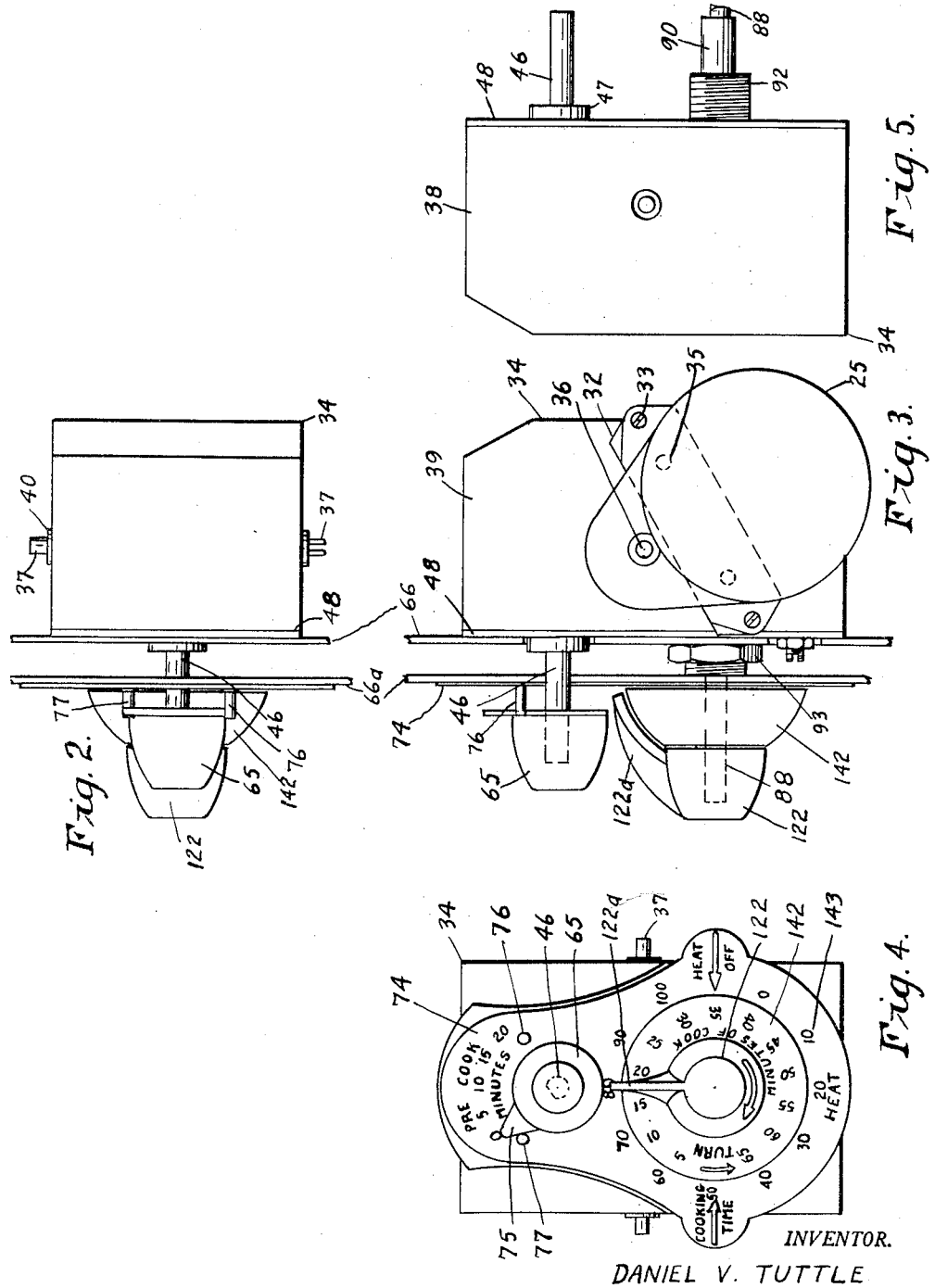

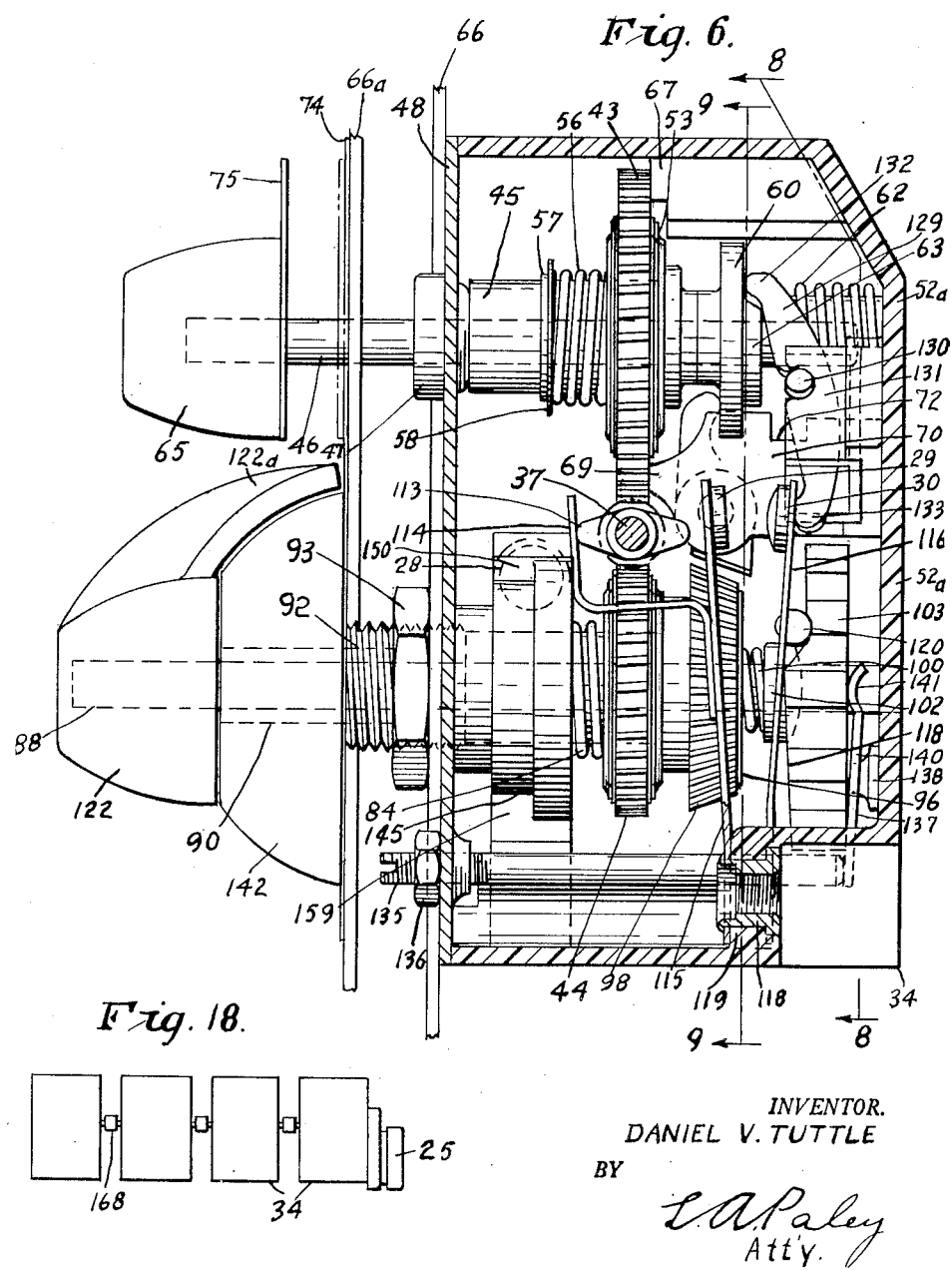

Oct. 29, 1957  D. V. TUTTLE  2,811,626
COMBINATION PRECOOK TIMER AND CONTROLLER TIMER
Filed May 18, 1954  6 Sheets-Sheet 4
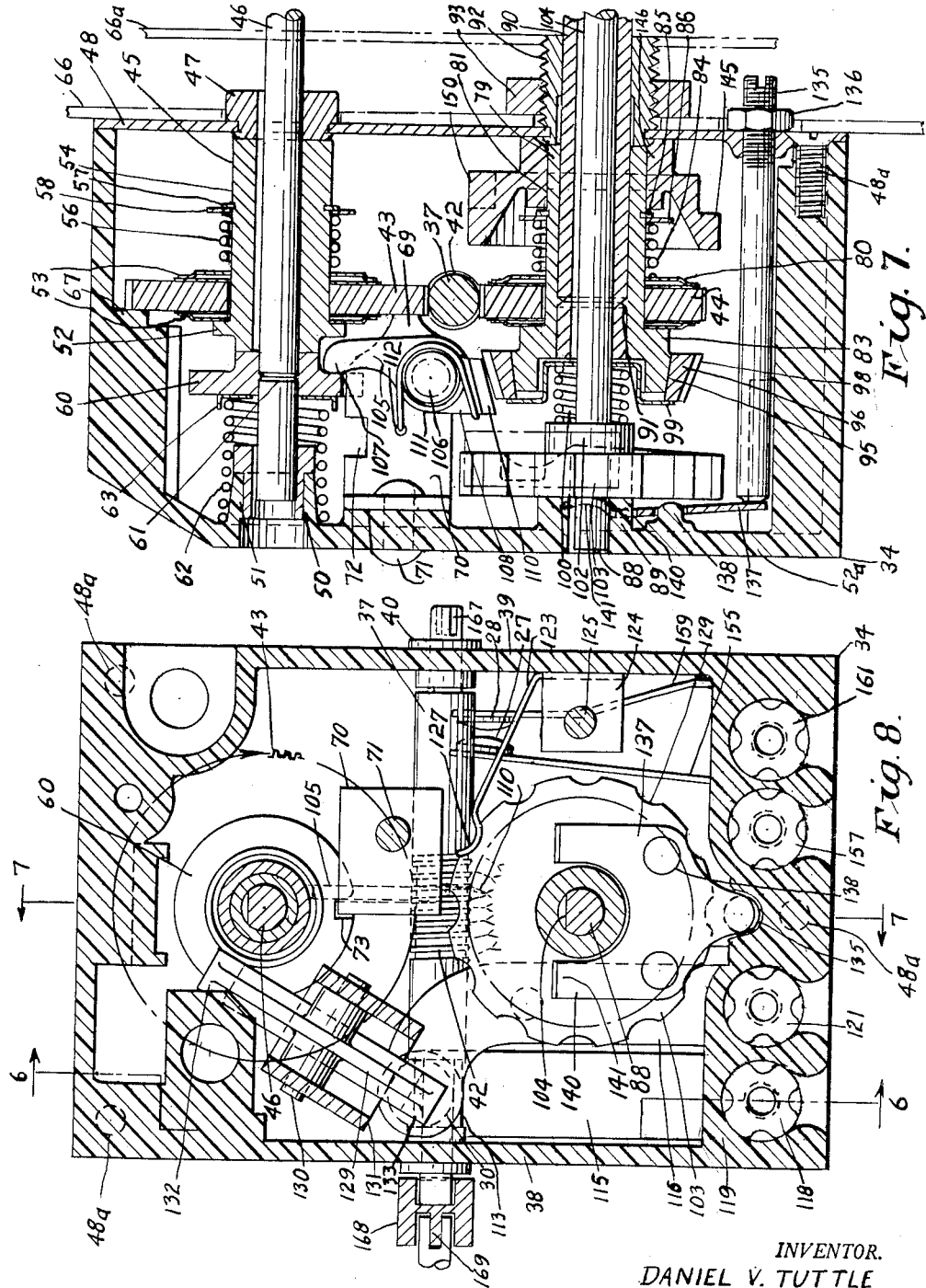
INVENTOR.
DANIEL V. TUTTLE
BY
[signature]
Att'y.

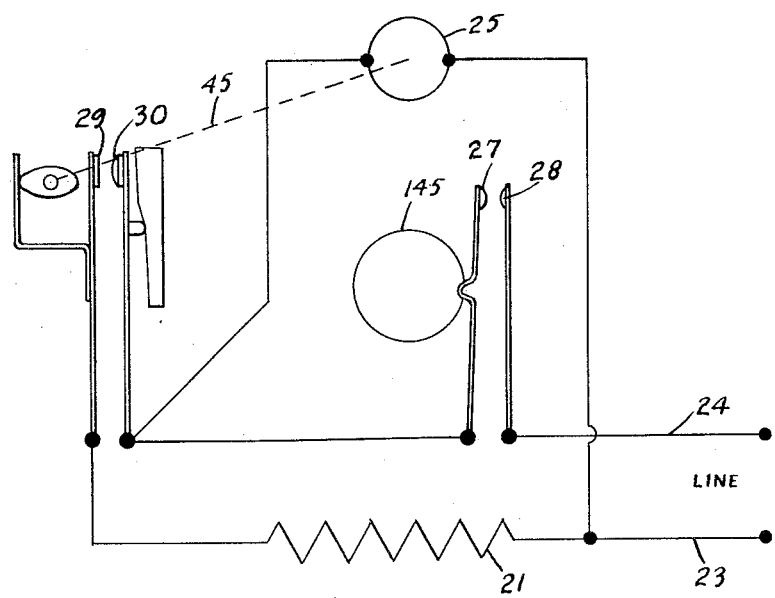
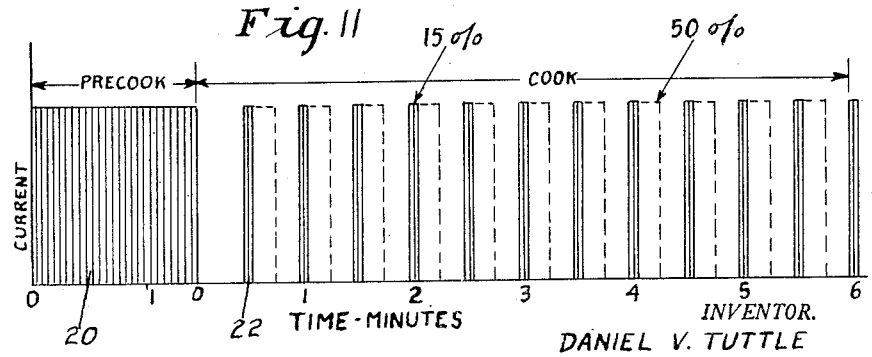

Oct. 29, 1957 D. V. TUTTLE 2,811,626
COMBINATION PRECOOK TIMER AND CONTROLLER TIMER
Filed May 18, 1954 6 Sheets-Sheet 6
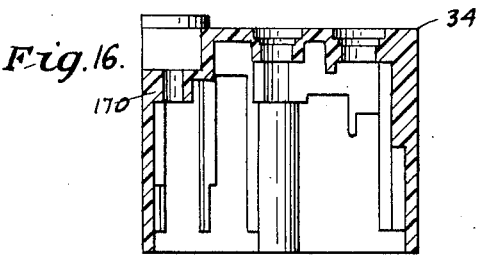
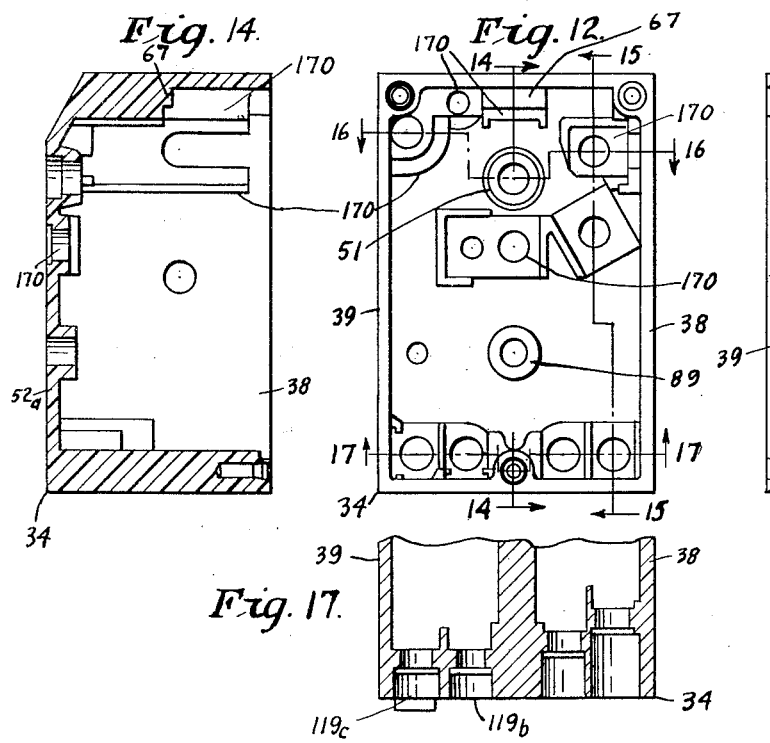
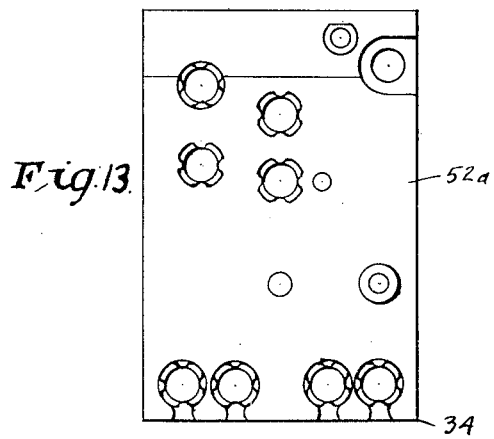
INVENTOR.
DANIEL V. TUTTLE
BY
L. A. Paley
Att'y.

United States Patent Office 2,811,626
Patented Oct. 29, 1957

2,811,626

COMBINATION PRECOOK TIMER AND CONTROLLER TIMER

Daniel V. Tuttle, Kirkland, Ill., assignor, by mesne assignments, to Tuttle & Kift, Inc., Chicago, Ill., a corporation of Illinois Application May 18, 1954, Serial No. 430,555

14 Claims. (Cl. 219—20)

This invention related to automatic controls for electric domestic cooking ranges, industrial ovens or other heating elements or devices.

In the conventional electric range, the operation of the oven is usually controlled by a clock. Control knobs are adjusted so that the oven turns on and off automatically at predetermined times to cook the food in the oven. No effort is made to control the time, temperature or amount of precook of the food nor the controlled cycling of the following cook. Also no effort is made to automatically control the operation of the burners at the top of the range. Bimetallic thermostats are used in general in domestic ranges, and these are not reliable and lead to numerous burnouts of heating elements with large replacement costs.

An object of the invention therefore is to provide an automatic control for electric ranges to regulate the time and temperature of precook of the food in the oven or upper burners.

Another object of the invention is to automatically control the time and temperature of cooking following precook, A further object of the invention is to automatically regulate the cycling of temperature in the heat zone, A still further object of the invention is to control the operation of an electric heating element without the use of bimetallic thermostat elements; also to improve electric controls in other respects hereinafter specified and claimed.

Reference is to be had to the accompanying drawings forming a part of this specification, in which Fig. 1 is an elevation of the switch with cover removed, Fig. 2 is a top view of the control device, Fig. 3 is a side view of the control device showing the timing motor in place, Fig. 4 is a front view of the control knobs and dial, Fig. 5 is a sectional view taken on line 5—5 of Fig. 6, Fig. 6 is a sectional view through the control device taken on line 6—6 of Fig. 5, Fig. 7 is a sectional view through the control device taken on line 7—7 of Fig. 8, Fig. 8 is a sectional view through the device taken on line 8—8 of Fig. 6, Fig. 9 is a sectional view through the device taken on line 9—9 of Fig. 6, Fig. 10 is a wiring diagram of the control device, Fig. 11 is a graphical representation of the heating cycles produced by the improved electric controls, Fig. 12 is a front elevation of the molded plastic case for the controls, showing certain non-functional lugs for other switch controls, Fig. 13 is a rear elevation of the case, Fig. 14 is a sectional view through the case taken on line 14—14 of Fig. 12, Fig. 15 is a sectional view through the case taken on line 15—15 of Fig. 12, Fig. 16 is a section view through the case taken on line 16—16 of Fig. 12, Fig. 17 is a sectional view through the case taken on line 17—17 of Fig. 12, and Fig. 18 is a view showing a plurality of switch controls grouped together by means of shaft couplings.

The general purpose of this device involves the use of a combination timer and infinite control of any degree of heat during the cooking period from 3% to 100% of the load. The timer governs the length of time for the heating element to be in operation. The power operating the motor is used in the infinite control to energize the heating element. The device also provides a control for a precook period up to 20 minutes at full heat, permitting the operator to select a predetermined time of anything between 0 and 20 minutes for the heating unit to be in high heat of precook. The control then automatically reverts to a lower preselected heat, such as simmer or medium heat as desired, and will operate to a preselected time up to 65 minutes and then automatically shut itself off.

Referring to Figs. 10 and 11 of the drawings, a precook period 20 is obtained by the use of a heating element 21 in an electric oven, not shown, or an upper burner, or other heating device. This precook period is obtained by the continuous application of electric current to the heating element 21 for a predetermined period, such as up to 1.5 minutes. The current is then caused to be pulsating by the automatic controls to be hereinafter described, so that spaced periods of heating 22 are produced at full heat during the cooking period. The shaded portion of Fig. 11 indicates electric power. The time of each pulsation of current may be adjusted by the controls from 3% to 100% of the load, thus controlling the temperature in the oven or other heating zone. The electric circuit of the invention, employs power lines 23 and 24 which branches to include in parallel a synchronous clock motor 25 and the heating element 21. A pair of switch contacts 27 and 28 and a pair of switch contacts 29 and 30 are included in the electrical circuit as will more fully be described.

The motor 25 may have an output speed of 1 R. P. M., and is attached to a spacing plate 32 by screws 33 (Fig. 3), said plate being attached to the side of a plastic molded case 34 by screws 35. The motor 25 has an output shaft 36 which is connected to a cam shaft 37 (Fig. 2), said shaft extending through the side walls 38 and 39 of said case 34. Suitable bearings 40 are provided in the side walls 38 and 39 to support the ends of shaft 37.

A worm 42 is formed on the shaft 37, said worm meshing with opposed 4° spiral gears 43 and 44 (Fig. 7). The gear 43 is rotatably mounted on a sleeve 45, and a control shaft 46 rotatably supports the sleeve 45. The shaft 46 is rotatably mounted in a bearing 47 which is secured in a case cover 48, said cover closing the open end of case 34. The cover 48 is secured to case 34 by three screws 48a. Another bearing 50 rotatably supports the opposite end of shaft 46 in a hub 51 which is formed in the rear wall 52a of case 34. A shoulder 52 is formed on the sleeve 45, and two pairs of friction clutch plates 53 are provided with D-holes which engage a flat 54 on one side of the sleeve 45 so that said clutch plates are forced to rotate with the sleeve 45. The gear 43 can rotate on sleeve 45 between the clutch plates 53, and a spring 56 is mounted on the sleeve 45 to press the friction clutch plates 53 firmly against the side walls of gear 43 so that normally, the gear 43 rotates with the sleeve 45. A snap ring 57 is mounted in an annular groove formed on sleeve 45, and a washer 58 is interposed between the ring 57 and the spring 56 to maintain spring 56 normally under compression. A disc 60 is secured by casting directly onto the shaft 46, anchoring groove 61 being provided for this purpose. A compression spring 62 is mounted on the hub 51 and a cup washer 63 is interposed between one end of spring 62 and disc 60. The spring 62 tends to urge the disc 60 and the shaft 46 axially to contact against the end of sleeve 45. A knob 65 (Fig. 6) is secured to the protruding end of shaft 46 and is spaced apart from a panel plate 66a. The operator can push the knob 65 inwardly to begin the operation of setting the controls, and when this is done, the gear 43 and sleeve 45 are restrained from axial movement by contacting against a lug 67 which is molded on the inside of case 34. The gear 43 also contacts against a shoulder 69 formed on a bracket 70 so as to prevent its axial movement when the knob 65 is pushed inwardly.

The bracket 70 is secured by a rivet 71 (Fig. 7) to the inside of case 34, said bracket 70 being L-shaped. A notch 72 is formed in the upper edge of bracket 70 and a notch 73 (Fig. 8) is formed in the periphery of disc 60 so that said notch 73 normally engages the upper edge of bracket 70. When the shaft 46 and the disc 60 are moved to the left (Fig. 7) by the operator, the disc 60 will eventually register with notch 72 and permit the operator to turn the knob 65 in a clockwise direction (Fig. 4) to the desired number of minutes from zero to 20 which is desired to use for the precook period. The number of minutes is preferably engraved in arcuate form on an escutcheon plate or dial 74, and a pointer 75 is formed on the knob 65 to indicate the number of minutes. Stop pins 76 and 77 are provided on the dial 74 to limit the arcuate movement of pointer 75.

The gear 44 (Fig. 7) is rotatably mounted on a sleeve 79, and two pairs of clutch plates 80 are mounted on the sleeve 79 by means of D-holes engaging a flat 81 on one side of the sleeve 79, so that the clutch plates 80 are constrained to rotate with sleeve 79 but the gear 44 can rotate on sleeve 79 between the slip clutch plates 80.

An annular shoulder 83 is formed on one end of sleeve 79 and one pair of clutch plates 80 bears against the shoulder 83 to limit the axial movement of gear 44. A compression spring 84 is mounted on the sleeve 79 and a snap ring 85 engages an annular slot formed in the sleeve 79. Washer 86 is mounted on sleeve 79 and is interposed between the end of spring 84 and the snap ring 85. Thus the spring 84 normally tends to urge gear 44 and clutch plates 80 into contact with the shoulder 83.

A shaft 88 is rotatably mounted in a bearing 89 formed in the rear wall 52 of case 34. A sleeve 90 is secured concentrically to the inside of sleeve 79 by casting into an anchoring groove 91 so that sleeves 79 and 90 move together and are permitted to be rocked angularly about shaft 88, said shaft 88 passing through the inside of sleeve 90. One end of sleeve 90 is rotatably mounted in a bearing 92 which is secured in the cover 48 by riveting or swaging. The panel member 66 is interposed between the lock nut 93 and cover 48 to secure the switch device in position on panel 66. The end of sleeve 79 engages against the bearing 92 to prevent axial movement of sleeve 79. A frusto-conical clutch surface 95 is formed on the shoulder 83, and a toothed ring 96 is provided with an inside frusto conical clutch surface mating with the clutch surface 95. Beveled saw teeth 98 are formed around the periphery of ring 96. A cup shaped washer 99 is mounted on the shaft 88 and is interposed between a compression spring 100 and the face of ring 96. The outer periphery of washer 99 engages against the face of the ring 96 so as to normally urge the friction clutch surface into contact and cause the rotation of ring 96 with the shoulder 83. The other end of spring 100 bears against a hub 102 formed on a cam 103. The hub 102 is cast on the shaft 88 so that cam 103 rotates with shaft 88. A lever 105 is rotatably mounted on a stud 106, said stud being secured to the bracket 70. One end 107 of the lever 105 bears against the side wall of disc 60, and the other end 108 of said lever 105 is provided with a diagonal knife edge 110 which can be caused by rotation of lever 105 to engage teeth 98 in ring 96 so as to prevent the rotation of said ring 96, and cause clutch faces 95 to slip when sleeve 79 is rotated manually as described later. A torsional spring 111 is mounted on the stud 106, one end of said spring engaging in a hole 112 in bracket 70, the other end of said spring engaging one end 108 on said lever 105. Thus when knob 65 and disc 60 are pushed inwardly, the knife edge 110 will engage teeth 98 and prevent the rotation of ring 96.

Cam shaft 37 is provided at one end with a double lobe cam 113 (Fig. 6) which engages a bracket 114 formed on a contact arm 115 to oscillate said contact arm 115 through small arcs to make and break contacts 29 and 30. The contact 29 is secured on the upper end of arm 115 and contact 30 is secured on the upper end of arm 116. The lower end of contact arm 115 is secured by a tapped rivet 118 to a boss 119 formed on the inside wall of case 34 for screw attachment of a wire conductor. The bottom end of arm 116 is secured by a tapped rivet 121 to the boss 119a (Fig. 17). The cam 103 (Fig. 6) has a spiral cam surface 118 formed on one of its faces, and a follower 120 is attached to the switch arm 116 by riveting, said follower being adapted to engage cam surface 118 and change the distance between contacts 29 and 30 when the cam 103 is rotated by means of a knob 122 which is secured to the outer end of shaft 88. A pointer 122a on knob 122 indicates percentage of heat on escutcheon plate 74. A detent arm 123 (Fig. 8) has a transverse flange 124 at one end which is secured by rivet 125 to the rear wall 52d of case 34. The other end of arm 123 is provided with a semi-annular detent 127 which engages in grooves 129 formed in the periphery of cam 103. The purpose of this detent 127 is to lock the cam 103 in any desired adjusted angular position to regulate the distance between contacts 29 and 30.

A rocker arm 129 is pivoted by trunnion 130 to a U-shaped bracket 131. One end 132 of rocker arm 129 bears against one face of disc 60, and the other end 133 of said rocker arm 129 bears against the upper end of contact arm 116. Thus when the knob 65 is moved inwardly together with disc 60, the rocker arm 129 will close contacts 29 and 30 to start the precook period at full heat, and the follower 120 being held clear of cam surface 118 during the precook period.

The cam 103 is molded permanently upon the shaft 88, and rotates with said shaft 88. In order to adjust the cam 103 axially, I provide a set bolt 135 with a lock nut 136. The inner end of said bolt 135 engages the bottom of an adjusting lever 137 which is pivotally mounted on two studs 138, said studs being secured to the rear wall 52 of case 34. The upper end of lever 137 is bifurcated to partially enclose the bearing 89 to form two arms 140. The upper end of each arm 140 is provided with an arcuate contact member 141 which engages one face of cam 103 to move said cam slightly axially when the bolt 135 is screwed inwardly, thus adjusting the distance between contacts 27 and 28.

Dial 142 is fixed to sleeve 90 and turns cam 145 closing main switch contacts 27 and 28 and also slipping clutches 80 and 95. A cam 145 is provided with a hub 146 having a D-hole which engages a flat 147 formed on the top side of sleeve 79. The hub 146 is fixed on the sleeve 79 and rotates with said sleeve 79 when said sleeve is rotated. A cam slot 149 (Figs. 1 and 9) is formed at one point in the periphery of cam 145, and a protrubing lobe 150 is formed on the outer periphery of cam 145 spaced apart by 90° from the groove 149. The lobe 150 and groove 149 are offset axially on the outer periphery of cam 145. The lobe 150 is positioned to contact with a lobe 151 formed on the bottom face of a lever 152. One end of the lever 152 is pivotally mounted on case cover 48 by means of a pin 153, and is provided with a spring 152a secured to cover 48 to urge said lever 152 in a counter clockwise direction (Fig. 1).

A switch arm 155 is mounted adjacent cam 145 and has on its upper end switch contact 27. The lower end of arm 155 has a transversely extending flange 156 which is secured by a tapped rivet 157 to the boss 119b (Fig.

17) formed on case 34. The lower end of a switch arm 159 is provided with a transversely extending flange 160 which is secured by a tapped rivet 161 to the boss 119c (Fig. 17). The upper end of switch arm 159 carries a switch contact 28.

A cam follower 161 is formed on switch arm 155 to engage in cam groove 149. A sloping lock surface 163 is formed on one end of the lever 152 and a clearance slot 164 is formed adjacent said surface 153. When knob 142 is turned, lobes 168 adjacent groove 149 moves the switch arm 155 to cause contacts 27 and 28 to close, and thus starts the operation of motor 25 and current flowing through the heating element 21. The turning of cam 145 by knob 142 also causes lobe 150 to disengage from lobe 151 so that surface 163 engages the top of switch arm 155 to lock the contacts 27 and 28 in closed position during the entire cooking period. As the sleeve 79 is rotated during the cooking period by gear 44, a time is reached at the end of the desired cooking period, when lobe 150 again engages lobe 151 to raise the lever 152 upwardly so that surface 163 disengages from the end of switch arm 155 to cause the contacts 27 and 28 to open with a snap action so as to stop the rotation of motor 25 and stop the passage of current through the heating element 21.

A number of the switch boxes 34 (Fig. 18) may be grouped together, such as four as shown, and operated by a single motor 25. To do this I provide diametrical slots 167, one in each end of the shaft 37, said slots being diametrically out of register to insure that any two switch boxes are not turned on simultaneously to produce an unduly large surge of current. A coupling 168 is provided with opposed driving lugs 169 to engage in the slots 167 to connect together the shafts 37 of the several switch boxes.

The case 34 is preferably molded of Bakelite and in order to save mold cost for switches of different internal construction, I provide certain non-functional lugs or other parts 170 (Figs. 12 and 14) which serve to support parts used in other switches having some parts in common and some different. Thus in the companion cases of Tuttle, Ser. No. 436,471, and Tuttle and Kelly, Ser. No. 436,470, are disclosed other switches using this identical switch box 34 and having some parts in common and some parts different.

In operation the housewife, or other operator, pushes in on knob 65 and turns said knob in a clockwise direction to the desired number of minutes, such as 15, indicated on dial 74, during which she desires to precook the food. This operation causes the disc 60 to move axially to the left (Fig. 7) until said disc registers with notch 72. The turning of knob 65 causes the notch 73 to move to an angular position relative to bracket flange 70 depending upon the minutes of precook. Notch 73 now being out of register with notch 72 prevents the spring 62 from returning the disc 60, shaft 46, and knob 65 to its original position until after the expiration of said precook period.

The operator then turns knob 122 to the percentage of heat desired as indicated on escutcheon plate 74, such as 40%, in the subsequent cooking operation. This operation causes the shaft 88 and cam 103 to rotate to a desired position depending upon the degree of heat, said position being yieldingly fixed by detent 127. The operator then turns knob 142 either clockwise or counterclockwise to the desired number of minutes of cooking operation, such as 55 minutes, and this turning of the knob causes sleeve 90 to rotate through an arc depending upon the minutes of cooking.

The movement of disc 60 (Fig. 6) acts to close switch contacts 29 and 30 by the action of rocker arm 129 on switcharm 116. The turning of sleeve 90 (Fig. 1) turns cam 145 so that contacts 27 and 28 are closed by cam lobe 166 on follower 161, the lever 152 moving downwardly so that surface 163 engages behind switch arm 155 thus maintaining the contacts 27 and 28 in closed position. Closing of the contacts 27, 28, 29 and 30 (Fig. 10) starts the operation of motor 25 and starts current passing through the heating element 21.

The starting of motor 25 causes the shaft 46, gear 43 and gear 44 to rotate. The cam 113 (Fig. 6) on shaft 37 is ineffective to open the contacts 29 and 30 because of the action of rocker arm 129, so that full current passes through the heating element 21 during the entire precook period.

The turning of disc 60 by the gear 43 eventually brings the notch 73 back into registry with bracket flange 70 so that spring 62 snaps the shaft 48 axially to the right (Fig. 7), rocker arm 129 releases contact arm 116, and disc 60 strikes the end 107 of lever 106 with an impact which releases the knife edge 110 from the saw tooth 98 thus allowing sleeve 79 freedom to rotate. This causes follower 120 to engage the cam surface 118 on cam 103, and the distance between contacts 29 and 30 is thus regulated by cam 103. The cam 113 now becomes effective to make and break contacts 29 and 30, and the switch device moves into the cooking period with current pulsating through heating element 21.

Gear 44 turns sleeve 90 (Fig. 7) slowly until cam lobe 150 engages lobe 151, so that stop surface 163 disengages contact arm 155, and contacts 27 and 28 are opened to stop the motor 25 and stop the flow of current through the heating element 21.

When knob 65 is first pushed inwardly, the lever 105 is moved in a counterclockwise direction (Fig. 7) so that knife edge 110 engages the teeth 98 of ring 96 and stops the rotation of said wheel. The slip clutch plates 80 being weaker than the clutch surface 95, permits the gear 44 to turn on sleeve 90 until the precook period is passed, after which the knife edge 110 disconnects from the toothed ring 96 and permits the sleeve 90 to rotate in the cooking period driven by the gear 44. Bolt 135 is adjusted to act on plate 137 and move the cam 103 slightly axially for fine adjustment of the distance between contacts 29 and 30.

In the claims to follow, the terms "precook" and "cooking" are used to designate any kind of heating process, whether used in domestic cooking ranges, in industrial ovens, or other heating devices. This application discloses and claims certain improvement on the devices of patents to Brown and Carson Nos. 2,194,586 and 2,194,587 of March 26, 1940.

I would state in conclusion that, while the example illustrated constitutes a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. In a switch control device for an electric heating element, a case, a motor mounted on said case, a cam shaft within said case operated by said motor, a drive cam on said shaft, a heating element in parallel circuit with said motor, switch contacts operated by said cam to make and break said circuit, a worm on said drive shaft, opposed gears meshing with said worm, a shaft supporting each of said gears, a pair of elements associated with one of said control shafts, a slip clutch associated with each of said elements to provide for rotation of one of said elements independently of the other said elements, means for providing a precook period at elevated temperature and a cooking period at a reduced temperature, a toothed ring associated with one of said slip clutches, and means engaging said toothed ring for preventing the rotation of said toothed ring.

2. In a switch control device for an electric heating element, a case, a motor mounted on said case, a cam shaft within said case operated by said motor, a drive cam on said shaft, a heating element in parallel circuit with said motor, switch contacts operated by said cam to make and break said circuit, a worm on said drive shaft, opposed gears meshing with said worm, a shaft supporting each of said gears, a pair of elements associated with one of said control shafts, a slip clutch associated with each of said elements to provide for rotation of one of said elements independently of the other said elements, means for providing a precook period at elevated temperature and a cooking period at a reduced temperature, a toothed ring associated with one of said slip clutches, a locking dog for engaging said toothed ring, and control means for causing said locking dog to engage said toothed ring and prevent the rotation of said ring.

3. In an automatic electric control for a heating element in a heat zone, a plastic molded case, a motor mounted on said case, a cam shaft within said case operated by said motor, a drive cam on said shaft, a heating element in circuit with said motor, a worm on said shaft, opposed gears meshing with said worm, a plurality of pairs of switch contacts in said circuit one pair of said contacts being arranged for controlling the operation of said motor, a control shaft for supporting each of said gears, means associated with one of said control shafts for actuating one pair of said switch contacts at predetermined times so as to operate said contacts to produce a precook period of continuous heat in said heat zone, means operated by said cam for causing said switch contacts to make and break periodically to provide a cooking period of predetermined temperature, control knobs on each of said control shafts, slip clutches associated with each of said control shafts, a projection on the inside of said case for preventing axial movement of one of said gears, a toothed ring associated with one of said slip clutches, a locking dog actuated by one of said control shafts for engaging said toothed ring to cause the slipping of said clutch, a control cam associated with one of said control shafts to regulate the time of contact of one pair of contacts under the action of said drive cam, a detent for fixing said control cam axially in adjusted position, and cam means associated with one of said control shafts for opening one of said contacts with a snap action.

4. A time and temperature controlled heating device comprising an electric heater, an auxiliary switch through which current is supplied to the heater for energization thereof, a motor by which the auxiliary switch is repetitively opened and closed to supply current intermittently to the heater, manually adjustable means by which the ratio of closing time of the repetitive operations of the auxiliary switch to the open time thereof is selectively variable to regulate the temperature to which the heater is energized, a master switch through which current is supplied to the auxiliary switch and to the motor, and two timing mechanisms which are operable by the motor and each of which is independently settable for performance of timing operations of various selectable lengths of time, one of which said timing mechanisms maintains the auxiliary switch closed during the time for which it is selectively set and the other of which said timing mechanisms maintains the master switch closed during the time for which it is selectively set.

5. A device as described in claim 4 which includes means which prevents timing operation of one timing mechanism while the other timing mechanism is performing its timing operation.

6. A device as described in claim 4 which includes holding means which is operable by the setting of one of the timing mechanisms to lock the other timing mechanism against timing operation thereof while the said timing means by which the holding means is operable is performing its timing operation.

7. A device described in claim 4 which includes holding means which is operable by the setting of one of the timing mechanisms to lock the other timing mechanism against timing operation thereof while the said timing means by which the holding means is operable is performing its timing operation, the timing mechanism which is thus locked having a slip connection which permits adjustment of the timing for which it is settable while it is locked by said holding means.

8. A device as described in claim 4 which includes means which is operable to prevent timing operation by one of the timing mechanisms during the timing operation of the other timing mechanism and causes the timing operations thereof to occur consecutively.

9. A device as described in claim 4 which includes means by which the time of initiation of the timing operation of one of the timing mechanisms is controlled by the timing operation of the other timing mechanism.

10. A device as described in claim 4 which includes means by which the master switch is closed throughout the timing operation of both timing mechanisms.

11. A device as described in claim 4 which includes means by which the master switch is closed throughout the timing operations of both timing mechanisms and the auxiliary switch is maintained closed during the timing operation of one of the timing mechanism and adapted to open and close repetitively during the timing operation of the other timing mechanism.

12. A device as described in claim 4 in which neither timing device is operable to perform its timing operation until the setting of the timing mechansm by which the master switch is maintained closed.

13. A device as described in claim 4 in which the setting of each timing mechanism closes the respective switch which is maintained closed thereby during the timing operation thereof.

14. A device as described in claim 4 in which the setting of each timing mechanism is adjustable during the operation of either timing mechanism.

References Cited in the file of this patent

UNITED STATES PATENTS

| | | |
|---|---|---|
| 1,522,988 | Warren | Jan. 13, 1925 |
| 2,185,878 | Adams et al. | Jan. 2, 1940 |
| 2,194,587 | Brown et al. | Mar. 26, 1940 |
| 2,220,028 | Smith | Oct. 29, 1940 |
| 2,268,737 | Brown | Jan. 6, 1942 |
| 2,295,298 | Sharp | Sept. 8, 1942 |
| 2,410,014 | Clark | Oct. 29, 1946 |
| 2,445,021 | Clark | July 13, 1948 |
| 2,503,082 | Tuttle | Apr. 4, 1950 |